United States Patent [19]
Oda

[11] Patent Number: 5,295,166
[45] Date of Patent: Mar. 15, 1994

[54] START-UP RANGE NEUTRON MONITOR SYSTEM

[75] Inventor: Naotaka Oda, Yokohama, Japan

[73] Assignee: Kabushiki Kaisha Toshiba, Kawasaki, Japan

[21] Appl. No.: 39,799

[22] Filed: Mar. 30, 1993

[30] Foreign Application Priority Data

Mar. 30, 1992 [JP] Japan .................................. 4-074327

[51] Int. Cl.$^5$ ............................................ G21C 17/00
[52] U.S. Cl. .................................................... 376/255
[58] Field of Search ............... 376/255, 254, 245, 214; 250/390.01

[56] References Cited

U.S. PATENT DOCUMENTS 4,655,994  4/1987  Greenberg ........................... 376/255
4,920,548  4/1990  Gaussa, Jr. et al. ................. 376/255

FOREIGN PATENT DOCUMENTS 63-213228  9/1988  Japan .
2-201174  8/1990  Japan .

*Primary Examiner*—Daniel D. Wasil
*Attorney, Agent, or Firm*—Oblon, Spivak, McClelland, Maier & Neustadt

[57] ABSTRACT

A start-up range neutron monitor system for monitoring neutrons generated from a neutron source comprises a neutron detector disposed in a non-earthed state and adapted to detect neutrons generated from the neutron source, a coaxial cable for externally transmitting a detection signal from the neutron detector, the coaxial cable being composed of a core and an outer sheath, a preamplifier incorporated on a way of the coaxial cable for amplifiying the detection signal, and a signal processing unit connected to the preamplifier through the coaxial cable to process the amplified detection signal amplified. The coaxial cable is composed of a first cable portion connecting the neutron detector and the preamplifier on an input side thereof and a second cable portion connecting the preamplifier and the signal processing unit on an output side of the preamplifier. A cable shield is further disposed so as to cover the first cable portion of the coaxial cable, wherein an earth side circuit on the signal processing unit is earthed and the cable shield is connected to an earth side circuit of the preamplifier, thus constituting the entire system as one point earth structure. A coil assembly including including first and second coils are also incorporated in the core and outer sheath of the first cable portion of the coaxial cable respectively alone or together with the cable shield. The first and second coils have the same inductance and are arranged so as to generate magnetic fluxes in directions reverse to each other.

9 Claims, 4 Drawing Sheets

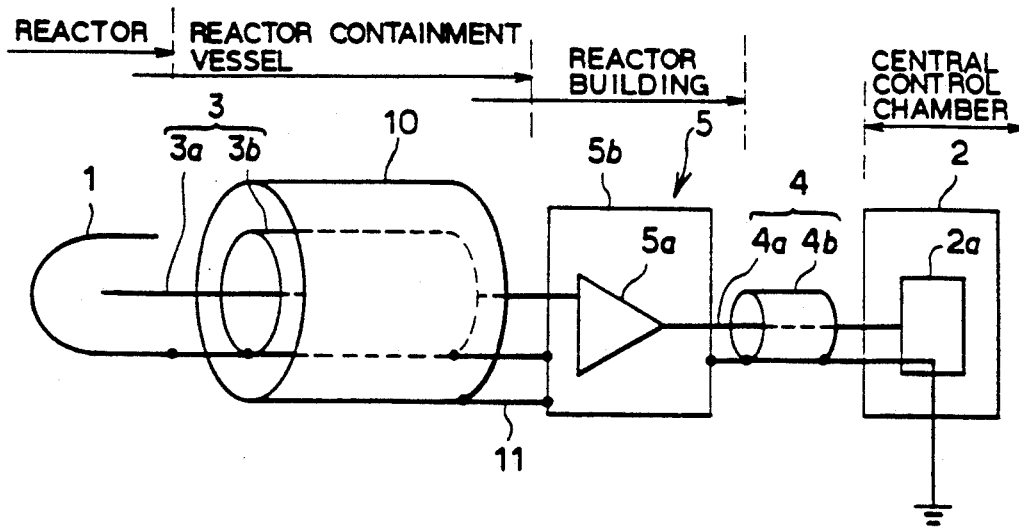
F I G. 1
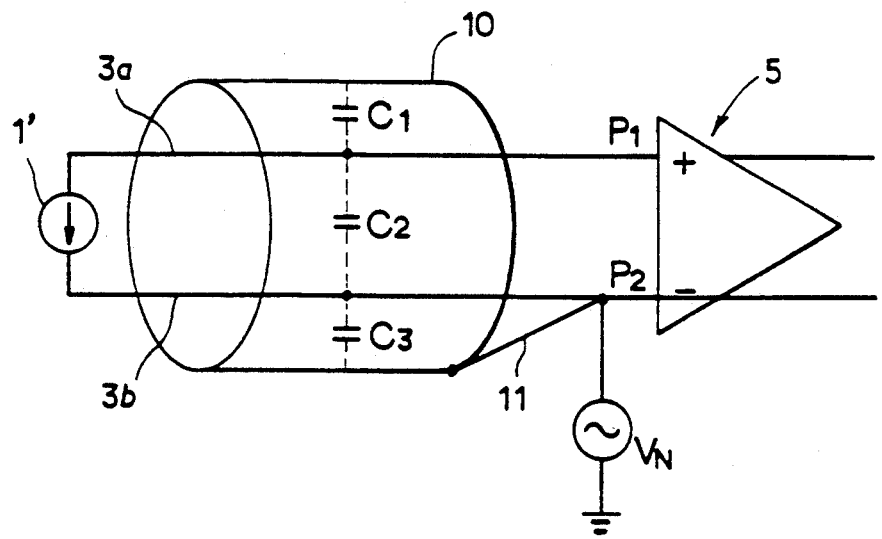
F I G. 2
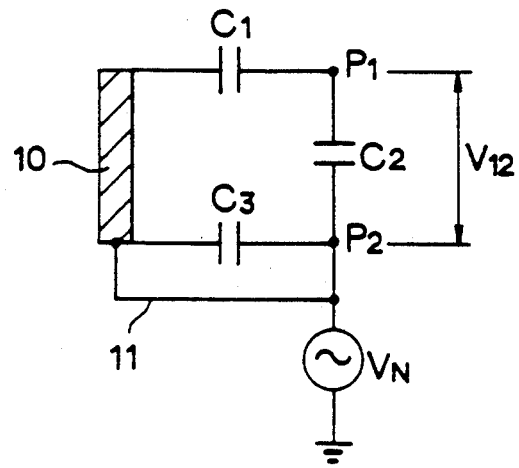
F I G. 3

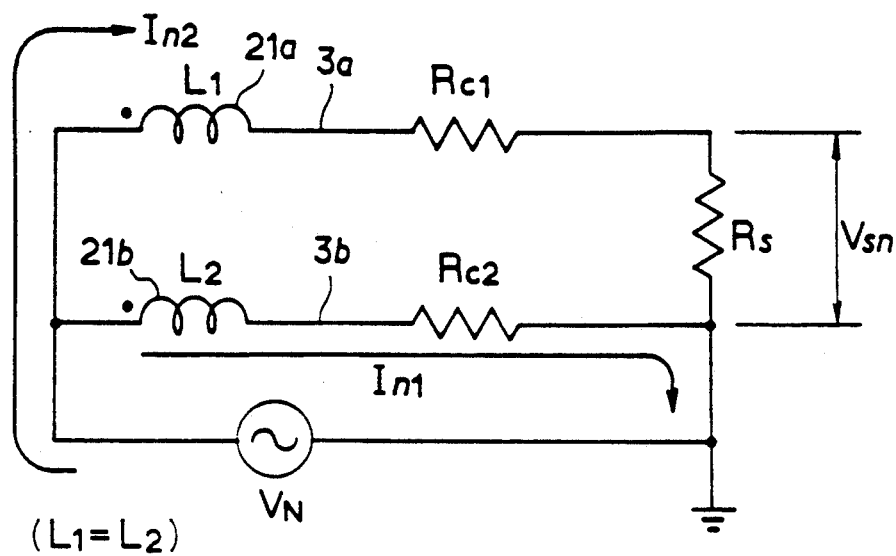
F I G. 6
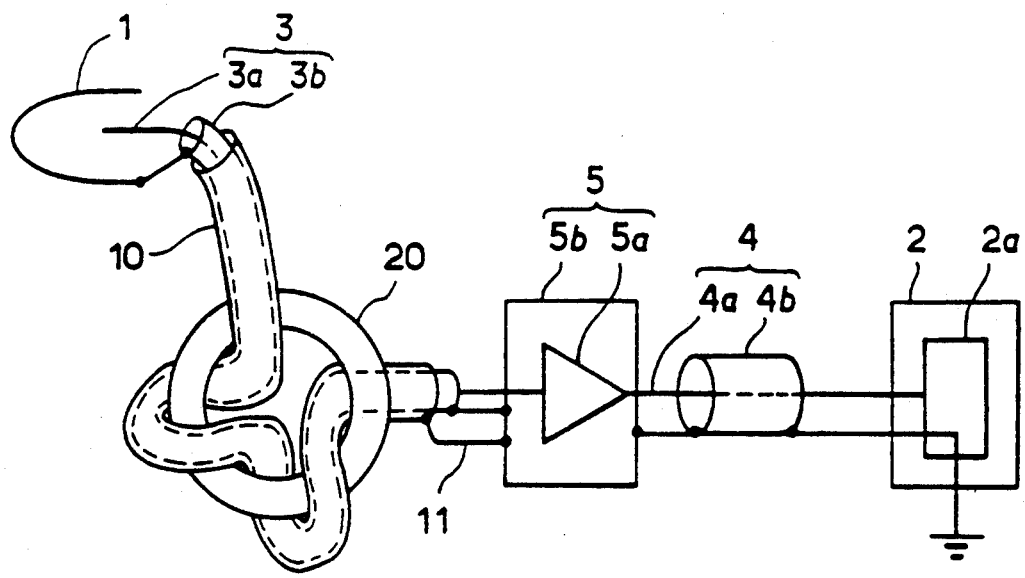
F I G. 7

START-UP RANGE NEUTRON MONITOR SYSTEM

BACKGROUND OF THE INVENTION

The present invention relates to a start-up range neutron monitor (SRNM) system in a nuclear power plant particularly for suppressing contamination of external noise.

A nuclear power plant includes a reactor building in which is installed a reactor containment vessle in which a reactor is disposed.

A structure of a known start-up range neutron monitor system in a nuclear power plant is shown in FIG. 8, and the known SRNM system of FIG. 8 comprises a neutron detector 1 arranged in a reactor, coaxial cables 3 and 4 for transferring signals detected by the neutron detector 1 to a signal processing unit 2a disposed inside a monitor 2 arranged in a central control chamber, and a preamplifier 5 disposed between these cables 3 and 4. Namely, the neutron detector 1 is operably connected to the preamplifier 5 in the reactor building through the coaxial cable 3 connecting the neutron detector 1 and the preamplifier 5 by penetrating inside the reactor containment vessel and the coaxial cable 4 connects the preamplifier 5 and the signal processing unit 2a. These coaxial cables 3 and 4 are composed of cores 3a and 4a and outer sheaths 3b and 4b for earthing, respectively. An earth circuit has one point earth structure earthed through the signal processing unit 2a.

In the known start-up range neutron monitor system of FIG. 8, electric pulse signals in response to thermal neutrons in the start-up range in the reactor are detected. The thus detected signal has a weak magnitude, so that the detected amplified by the preamplifier 5 and then treated with by the signal processing unit 2a of the monitor 2.

However, since the known SRNM system has a structure in which, as described above, the neutron detector 1 and the preamplifier 5 are connected through the coaxial cable 3, when the external noise is transferred to the coaxial cable 3, an S/N (signal/noise) ratio of the weak signal is extremely lowered by the external noise, thus being inconvenient.

This problem will be explained in detail with reference to FIGS. 9 and 10.

Supposing that the external noise is invaded into the coaxial cable 3 on the input side of the preamplifier 5 and a noise current $I_N$ is caused by the external noise in the outer sheath 3b, a circuit in such case will be modeled as that shown in FIG. 9 and an equivalent circuit is shown in FIG. 10, in which reference numeral 1' denotes a detection signal source by means of the neutron detector 1.

Referring to FIGS. 9 and 10, the start-up range neutron monitor system has, as a whole, one point earth structure in the central control chamber, and the neutron detector 1 has an isolated, i.e. non-earthed, structure. For this reason, when an impedance of the coaxial cable 3 and the circuit is supposed to $R_C$, a noise voltage $V_{12}$, caused between both poles $P_1$ and $P_2$ of the preamplifier 5 is represented as $$V_{12} = I_N \cdot R_C \tag{1}$$

That is, even if the noise current $I_N$ be weak, the noise voltage $V_{12}$ becomes $R_C$ times of the current $I_N$, so that the S/N ratio of the detected weak signal of the neutron detector 1 is lowered, thus requiring a complicated signal processing circuit of the monitor 2 disposed on the output side of the preamplifier 5 and an increased load for calculation of the signal processing, thus imparting adverse influence on the signal treatment.

SUMMARY OF THE INVENTION

An object of the present invention is to substantially eliminate defects or drawbacks encountered in the prior art and to provide a start-up range neutron monitor system capable of easily processing a neutron detection signal by improving a noise resisting property on the input side of a preamplifier disposed, for example, in a reactor building in a nuclear power plant.

This and other object can be achieved according to the present invention by providing, in one aspect, a start-up range neutron monitor system for monitoring neutrons generated from a neutron source, comprising:

a neutron detector disposed in a non-earthed state and adapted to detect neutrons generated from the neutron source;

a coaxial cable for externally transmitting a detection signal from the neutron detector;

a preamplifier incorporated on a way of the coaxial cable for amplifiying the detection signal;

a signal processing unit operably connected to the preamplifier through the coaxial cable to process the detection signal amplified by the preamplifier, the coaxial cable being composed of a first cable portion connecting the neutron detector and the preamplifier on an input side of the preamplifier and a second cable portion connecting the preamplifier and the signal processing unit on an output side of the preamplifier; and a cable shield disposed so as to cover the first cable portion of the coaxial cable, wherein an earth side circuit on the signal processing unit is earthed and the cable shield is connected to an earth side circuit of the preamplifier to thereby constitute the entire system as one point earth structure.

The coaxial cable is composed of a core and an outer sheath surrounding the core. The cable shield is composed of a shield cable arranged to coaxially surround the coaxial cable. The preamplifier is composed of an amplifier circuit and a casing constituting the earth side circuit of the preamplifier, the shield cable being connected to the casing.

The start-up range neutron monitor system is disposed in a nuclear power plant including a reactor building, a reactor containment vessel disposed in the reactor building and a reactor disposed in the reactor containment vessel, wherein the neutron detector is disposed in the reactor, the preamplifer is disposed in the reactor building and the first cable portion of the coaxial cable penetrates the reactor containment vessel.

According to this aspect of the start-up range neutron monitor system of the present invention, when an external noise is invaded into the first cable portion of the coaxial cable on the input side of the preamplifier, a noise current in the outer sheath of the coaxial cable is earthed through the most outside cable shield. That is, the noise current is directly earthed not through the outer sheath of the coaxial cable and a voltage generated to the input end of the preamplifier becomes substantially zero, so that the external noise hardly affects on the signal processing unit for the neutron detection signal.

In another aspect of the present invention, there is provided a start-up range neutron monitor system for monitoring neutrons generated from a neutron source, comprising:

a neutron detector disposed in a non-earthed state and adapted to detect neutrons generated from the neutron source;

a coaxial cable for externally transmitting a detection signal from the neutron detector, the coaxial cable being composed of a core and an outer sheath surrounding the core;

a preamplifier incorporated on a way of the coaxial cable for amplifying the detection signal;

a signal processing unit operably connected to the preamplifier through the coaxial cable to process the detection signal amplified by the preamplifier, the coaxial cable being composed of a first cable portion connecting the neutron detector and the preamplifier on an input side of the preamplifier and a second cable portion connecting the preamplifier and the signal processing unit on an output side of the preamplifier; and a coil assembly including first and second coils incorporated in the core and outer sheath of the first cable portion of the coaxial cable respectively, the first and second coils having same inductance and being arranged so as to generate magnetic fluxes in directions reverse to each other.

The coil assembly comprises a ring core and a portion of the first cable portion which is wound up around the ring core.

The start-up range neutron monitor system is disposed in a nueclear power plant including a reactor building, a reactor containment vessel disposed in the reactor building and a reactor disposed in the reactor containment vessel, wherein the neutron detector is disposed in the reactor, the preamplifer is disposed in the reactor building and the first cable portion of the coaxial cable penetrating the reactor containment vessel.

According to this aspect of the start-up range neutron monitor system of the present invention, the inductances of the coils inserted into the core and the outer sheath of the first portion of the coaxial cable on the input side of the preamplifer are the same with each other and these coils have the magnetic flux generating directions reverse to each other. Accordingly, the insertion of the coils do not affects on the neutron detection signal by making larger an input impedance on the side of the preamplifier than those of the core and the outer sheath of the coaxial cable. Moreover, interferance of the noise current due to the external noise to the detection signal can be reduced by setting the inductance of the coil to a value larger than a value obtained by dividing the impedance of the outer sheath by an angular frequency.

BRIEF DESCRIPTION OF THE DRAWINGS

For a better uderstanding of the present invention and to show how the same is carried out, reference is made, by way of preferred embodiments, to the accompanying drawings, in which:

FIG. 1 is a schematic block diagram representing a first embodiment of a start-up range neutron monitor system according to the present invention;

FIG. 2 is a view showing a circuit structure of an input side of a preamplifier incorporated in the system of the first embodiment of FIG. 1;

FIG. 3 is an equivalent circuit of FIG. 2;

FIG. 6 is an equivalent circuit of FIG. 5 at a time of noise transfer;

FIG. 7 is a block diagram representing a modified embodiment of a start-up range neutron monitor system according to the present invention;

DESCRIPTION OF THE PREFERRED EMBODIMENTS

Figure 8:
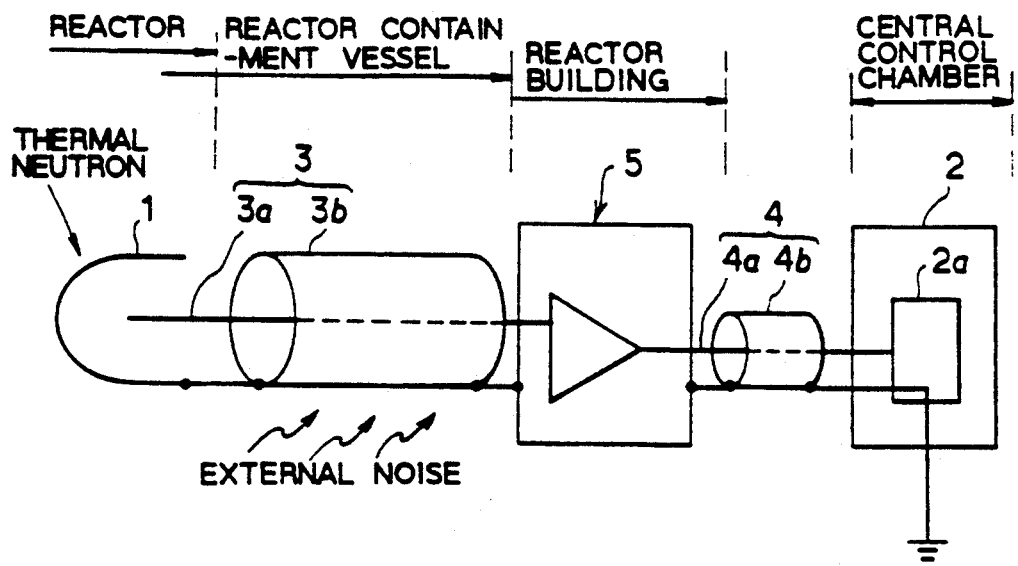
FIG. 8 is a block diagram representing a start-up range neutron monitor system of a conventional structure.
Figure 9:
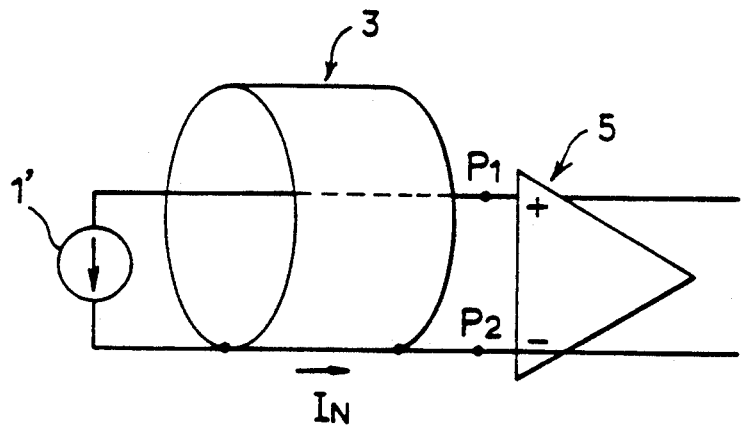
FIG. 9 is a view showing a circuit structure on the input side of a preamplifier incorporated in the system of FIG. 8.
Figure 10:
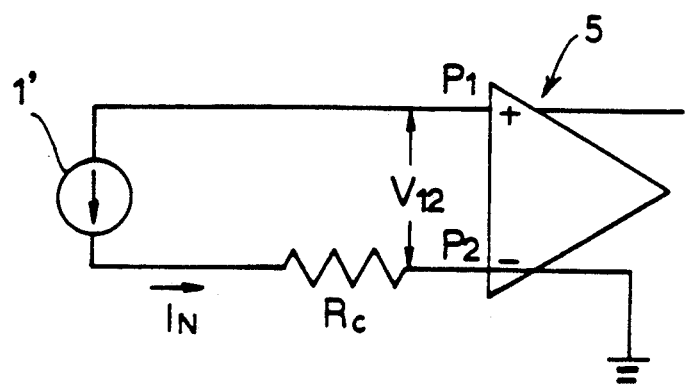
FIG. 10 is an equivalent circuit of FIG. 9.

Preferred embodiments of a start-up range neutron monitor system according to the present invention will be described hereunder with reference to the accompanying drawings, in which like reference numerals are added to elements or portions corresponding to those shown in FIGS. 8 to 10 showing a conventional structure.

A first embodiment is first described with reference to FIGS. 1 to 3. FIG. 1 shows a start-up range neutron monitor system, which is adapted preferably for a nuclear reactor and is composed of an isolated, i.e. non-earthed, neutron detector 1 disposed inside the reactor, coaxial cables 3 and 4 transferring a neutron detection signal form the neutron detector 1 to a signal processing unit 2a in a monitor 2 disposed in a central control chamber, a preamplifier 5 interposed between these coaxial cables 3 and 4, and a shield cable 10 applied to the coaxial cable 3 as a shield member. Namely, the neutron detector 1 is connected to the preamplifier 5 disposed in a reactor building through the coaxial calbe 3, on the side of the detector, arranged so as to pass a reactor containment vessel, and on the other hand, the preamplifier 5 is connected to the signal procesing unit 2a through the coaxial cable 4 on its output side. These coaxial cables 3 and 4 are composed of cores 3a and 4a and sheaths 3b and 4b for earthing, respectively. It is of course to be noted that the coaxial cables 3 and 4 are composed of a single cable on the way of which the preamplifier is incorporated or two coaxial cables are disposed on the input and output sides of the preamblifier.

The preamplifier 5 is composed of an amplifying circuit 5a and a casing 5b forming an earth circuit, and the coaxial cables 3 and 4 have the outer sheaths 3b and 4b which are operably connected to each other through the casing 5b of the preamplifier 5.

The shield cable 10 covering the coaxial cable 3 on the side of the detector 1 is formed of a conductive material and is connected to the casing 5b through an earth cable 11. The earth circuit is grounded through the signal processing unit 2a, whereby whole the system is constructed so as to have one point earth structure.

According to the start-up range neutron monitor system of this embodiment, electric pulse signals in response to thermal neutrons in the start-up range of the reactor are detected by the neutron detector 1 likely as in the conventional system. Although the detected signal has a weak magnitude, it is amplifed by the preamplifier 5 and subjected to the predetermined signal treatment through the signal processing unit 2a in the monitor 2.

FIGS. 2 and 3 are views for the explanatory of the noise shielding functions and effects according to this first embodiment of the present invention.

Referring to FIG. 2, floating capacities $C_1$ to $C_3$ are present between the coaxial cable 3 on the input side of the preamplifier 5 and the shield cable 10 covering the coaxial cable 3. That is, the floating capacity $C_1$ exists between the core 3a of the coaxial cable 3 and the shield cable 10, the floating capacity $C_2$ exists between the core 3a and the sheath 3b and the floating capacity $C_3$ exists between the sheath 3b and the shield cable 10. Reference numeral 1' denotes a detection signal source for the neutron detector 1. The circuit structure schematically shown in FIG. 2 will be substituted with an equivalent circuit of FIG. 3.

In the circuit connected as described above, when the external noise of the noise voltage $V_N$ is transferred to the coaxial cable 3, the external noise is captured by the shield cable 10 and the noise current is earthed through the shield cable 10. Namely, the noise current is directly flown to the earth through a pass in which the earth resistance is most lowered by means of the shield cable 10, whereby the voltage $V_{12}$ between input ends $P_1$ and $P_2$ of the amplifying circuit 5a caused in response to the noise voltage $V_N$ becomes $V_{12}=0$.

According to the shielding structure described above, the external noise hardly affects on the neutron detection signal and the lowering of the S/N ratio caused by the external noise can be hence prevented substantially perfectly. Therefore, there is no need for adding a specific treating circuit to the coaxial cable 3 for the treatment of the external noise and the operational load on the signal treatment cannot be increased, thus easily facilitating the signal treatment.

Figure 4:
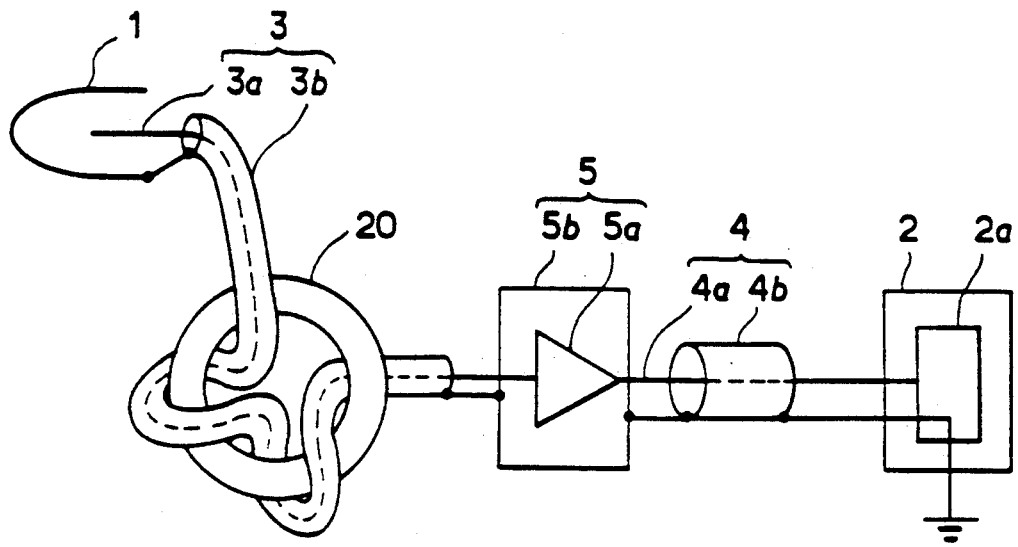
FIG. 4 is a schematic block diagram representing a second embodiment of a start-up range neutron monitor system according to the present invention.
Figure 5:
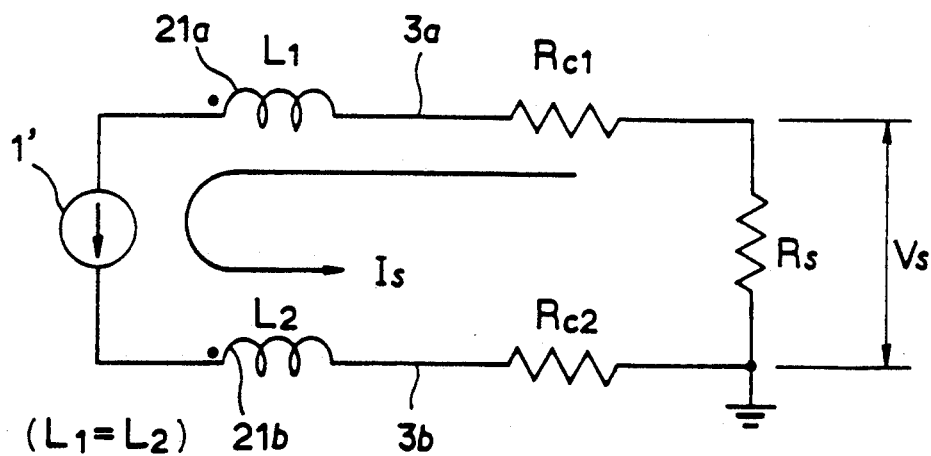
FIG. 5 is a view showing an equivalent circuit structure of an input side of a preamplifier at a time of signal detection.

A second embodiment of the start-up range neutron monitor system according to the present invention will be next described hereunder with reference to FIGS. 4 to 6, in which like reference numerals are added to elements or portions corresponding to those of the first embodiment.

In the start-up range neutron monitor system of FIG. 4, a ring core 20 formed by forming a magnetic member into a ring shape is newly added, and a portion of the coaxial cable 3 connecting the neutron detector 1 and the preamplifier 5 is wound around the ring core 20. The structure of the monitor system other than this structure of the ring core 20 is substantially the same as the structure of the monitor system of the first embodiment.

The noise shielding function and effect according to the second embodiment will be explained hereunder with reference to FIGS. 5 and 6. As described above, in a circuit constituted by the coaxial cable 3 in association with the ring core 20, coils 21a and 21b are equivalently incorporated, and the coils 21a and 21b have inductances $L_1$ and $L_2$ of substantially the same value ($L_1=L_2=L$) and have directions of magnetic flux generations reverse to each other with respect to the detection signal source 1'. Namely, FIG. 5 shows an equivalent circuit with rspect to the neutron detection signal in the case where the coil 21a inserted into the core 3a of the coaxial cable 3 has the inductance $L_1$ and the coil 21b inserted into the outer sheath 3b of the coaxial cable 3 has the inductance $L_2$. FIG. 6 shows an equivalent circuit with respect to the external noise.

In FIGS. 5 and 6, symbols $R_{C1}$ and $R_{C2}$ represent line impedances of the core 3a and the outer sheath 3b and a symbol $R_S$ represents an input impedance of the preamplifier 5. In this second embodiment, the input impedance $R_S$ of the preamplifier 5 is set to a value sufficiently larger than those of the line impedances $R_{C1}$ and $R_{C2}$.

Referring to the equivalent circuit of FIG. 5, a voltage $V_S$ between both ends of the input impedance $R_S$ in the case of an detection current $I_S$ by means of the detection signal source 1' for the neutron detector 1 is expressed as follows.

$$V_S = I_S \cdot R_S \qquad (2)$$

As can be seen from this equation, the insertion of the coils 21a and 21b does not affect on the detection current $I_S$.

Next, with reference to FIG. 6, showing the state of the external noise invasion, symbols $I_{n2}$ and $I_{n1}$ represent noise currents passing the core 3a and the sheath 3b, respectively, due to the external noise, and a symbol $V_{sn}$ represents a noise voltage generated between both ends of the input impedance $R_S$ due to the external noise. In this equivalent circuit, the relationship $L_1=L_2=L$ is established and the impedance $R_S$ has a value sufficiently larger than those of the line impedances $R_{C1}$ and $R_{C2}$. Accordingly, the noise voltage $V_{sn}$ is approximately determined by an impedance distribution ratio on the side of the sheath and expressed as follows.

$$V_{sn} = V_N \cdot (R_{C2}/L)/(j\omega + R_{C2}/L) \qquad (3)$$
$$= V_N/[((j\omega L/R_{C2}) + 1]$$

In this equation, the line impedance $R_{C2}$ is extremely samll and the inductance L is sufficiently larger than the value $[R_{C2}/\omega]$, and accordingly, the absolute value of the denominator of the equation (3) becomes larger than [1] and the noise voltage $V_{sn}$ hence becomes small. Namely, in consderation of circuit theory, as almost all the noise current due to the external noise passes on the side of the outer sheath, the noise voltage $V_{sn}$ becomes sufficiently smaller than the external noise voltage $V_N$. Thus, the invasion of the external noise into the signal system can be suppressed, thus improving the S/N ratio. This noise suppressing effect can be more improved as the frequency of the noise becomes higher.

According to the second embodiment, substantially the same effects as those attained by the first embodiment can be achieved, thus improving the noise resisting property. Particularly, according to this second embodiment, the coils 21a and 21b having same inductance and reverse magnetic flux directions can be equivalently and easily inserted, respectively, to the core 3a and the core 10. It is of course understood that independent coils can be inserted respectively.

In a modified embodiment, a combination of the shield structures of the first and second embodiments may be realized as shown in FIG. 7, in which the like reference numerals are added to elements or portions corresponding to those of FIGS. 1 and 4. According to this modified embodiment, combined effects of those of the first and second embodiments will be attained to thereby further improve the noise resisting property with respect to the input side of the preamplifier.

As described above, the structure of the present invention can be applied to other systems each in which the detection system has same one point earth structure, that is, a detection signal source is non-earthed and a signal processing side connected to the detection signal source through a coaxial cable is earthed. According to such structure, the noise resisting property can be remarkably improved even with respect to a weak detection signal.

What is claimed is:

1. A start-up range neutron monitor system for monitoring neutrons generated from a neutron source, comprising:
   a neutron detector disposed in a non-earthed state and adapted to detect neutrons generated from the neutron source;
   a coaxial cable means for externally transmitting a detection signal from the neutron detector;
   a preamplifier means incorporated on a way of the coaxial cable means for amplifying the detection signal;
   a signal processing unit operably connected to the preamplifier means through the coaxial cable means to process the detection signal amplified by the preamplifier means, said coaxial cable means being composed of a first cable portion connecting the neutron detector and the preamplifier means on an input side of the preamplifier means and a second cable portion connecting the preamplifier means and the signal processing unit on an output side of the preamplifier means; and
   a cable shield means disposed so as to cover the first cable portion of the coaxial cable means,
   wherein an earth side circuit on the signal processing unit is earthed and said cable shield means is connected to an earth side circuit of the preamplifier means to thereby constitute the entire system as one point earth structure.

2. A start-up range neutron monitor system according to claim 1, wherein said coaxial cable means is composed of a core and an outer sheath surrounding the core.

3. A start-up range neutron monitor system according to claim 1, wherein said cable shield means is composed of a shield cable arranged to coaxially surround said coaxial cable means.

4. A start-up range neutron monitor system according to claim 3, wherein said preamplifier means is composed of an amplifier circuit and a casing constituting the earth side circuit of the preamplifier means, said shield cable being connected to the casing.

5. A start-up range neutron monitor system according to claim 1, which is disposed in a nuclear power plant including a reactor building, a reactor containment vessel disposed in the reactor building and a reactor disposed in the reactor containment vessel, said neutron detector being disposed in the reactor, said preamplifier means being disposed in the reactor building and said first cable portion of the coaxial cable means penetrating the reactor containment vessel.

6. A start-up range neutron monitor system for monitoring neutrons generated from a neutron source, comprising:
   a neutron detector disposed in a non-earthed state and adapted to detect neutrons generated from the neutron source;
   a coaxial cable means for externally transmitting a detection signal from the neutron detector, said coaxial cable means being composed of a core and an outer sheath surrounding the core;
   a preamplifier means incorporated on a way of the coaxial cable means for amplifying the detection signal;
   a signal processing unit operably connected to the preamplifier means through the coaxial cable means to process the detection signal amplified by the preamplifier means, said coaxial cable means being composed of a first cable portion connecting the neutron detector and the preamplifier means on an input side of the preamplifier means and a second cable portion connecting the preamplifier means and the signal processing unit on an output side of the preamplifier means; and
   a coil means including first and second coils incorporated in said core and outer sheath of the first cable portion of the coaxial cable means respectively, said first and second coils having same inductance and being arranged so as to generate magnetic fluxes in directions reverse to each other.

7. A start-up range neutron monitor system according to claim 6, wherein said coil means comprises a ring core and a portion of said first cable portion which is wound up around the ring core.

8. A start-up range neutron monitor system according to claim 6, which is disposed in a nuclear power plant including a reactor building, a reactor containment vessel disposed in the reactor building and a reactor disposed in the reactor containment vessel, said neutron detector being disposed in the reactor, said preamplifier means being disposed in the reactor building and said first cable portion of the coaxial cable means penetrating the reactor containment vessel.

9. A start-up range neutron monitor system for monitoring neutrons generated from a neutron source, comprising:
   a neutron detector disposed in a non-earthed state and adapted to detect neutrons generated from the neutron source;
   a coaxial cable means for externally transmitting a detection signal from the neutron detector, said coaxial cable means being composd of a core and an outer sheath surrounding the core;
   a preamplifier means incorporated on a way of the coaxial cable means for amplifying the detection signal;
   a signal processing unit operably connected to the preamplifier means through the coaxial cable means to process the detection signal amplified by the preamplifier means, said coaxial cable means being composed of a first cable portion connecting the neutron detector and the preamplifier means on an input side of the preamplifier means and a second cable portion connecting the preamplifier means and the signal processing unit on an output side of the preamplifier means;
   a cable shield means disposed so as to cover the first cable portion of the coaxial cable means, wherein an earth side circuit on the signal processing unit is earthed and said cable shield means is connected to an earth side circuit of the preamplifier means to thereby constitute the entire system as one point earth structure; and a coil means including first and second coils incorporated in said core and outer sheath of the first cable portion of the coaxial cable means respectively, said first and second coils having same inductance and being arranged so as to generate magnetic fluxes in directions reverse to each other.

* * * * *